United States Patent [19]
Saarem et al.

[11] 3,757,263
[45] Sept. 4, 1973

[54] SOLENOID VALVE OPERATOR

[75] Inventors: Myrl J. Saarem; Delbert L. Merriner, both of Carson City, Nev.

[73] Assignee: Richdel, Inc., Carson City, Nev.

[22] Filed: July 24, 1972

[21] Appl. No.: 274,318

[52] U.S. Cl.................. 335/260, 335/262, 251/129
[51] Int. Cl. .............................................. H01f 7/08
[58] Field of Search.................... 335/245, 251, 257, 335/260, 262; 251/129

[56] References Cited
UNITED STATES PATENTS

| | | | |
|---|---|---|---|
| 3,598,360 | 8/1971 | Merriner et al...................... | 251/129 |
| 3,331,042 | 7/1967 | Erickson.............................. | 335/260 |
| 2,353,835 | 7/1944 | Lane et al............................ | 335/260 |
| 3,134,932 | 5/1964 | Ray.................................... | 335/251 X |
| 3,082,359 | 3/1963 | Mangiafico ...................... | 335/260 X |

*Primary Examiner*—George Harris
*Attorney*—Keith D. Beecher

[57] ABSTRACT

An improved solenoid valve operator is provided which is particularly suitable for use in conjunction with valves in vending machines for hot liquids, such as coffee, or the like. The valve operator of the invention includes a plastic molded casing which encloses the operating components of the solenoid operator, and which includes a tubular member that contains the core of the solenoid and the slidable plunger. The plastic casing defines a peripheral channel about the end of the tubular member, and an O-ring is received in the peripheral channel. The O-ring provides a seal between the plastic casing and the fluid controlled by the valve, so that only corrosion resistant and non-reactive materials are exposed to the fluid.

3 Claims, 1 Drawing Figure

PATENTED SEP 4 1973
3,757,263
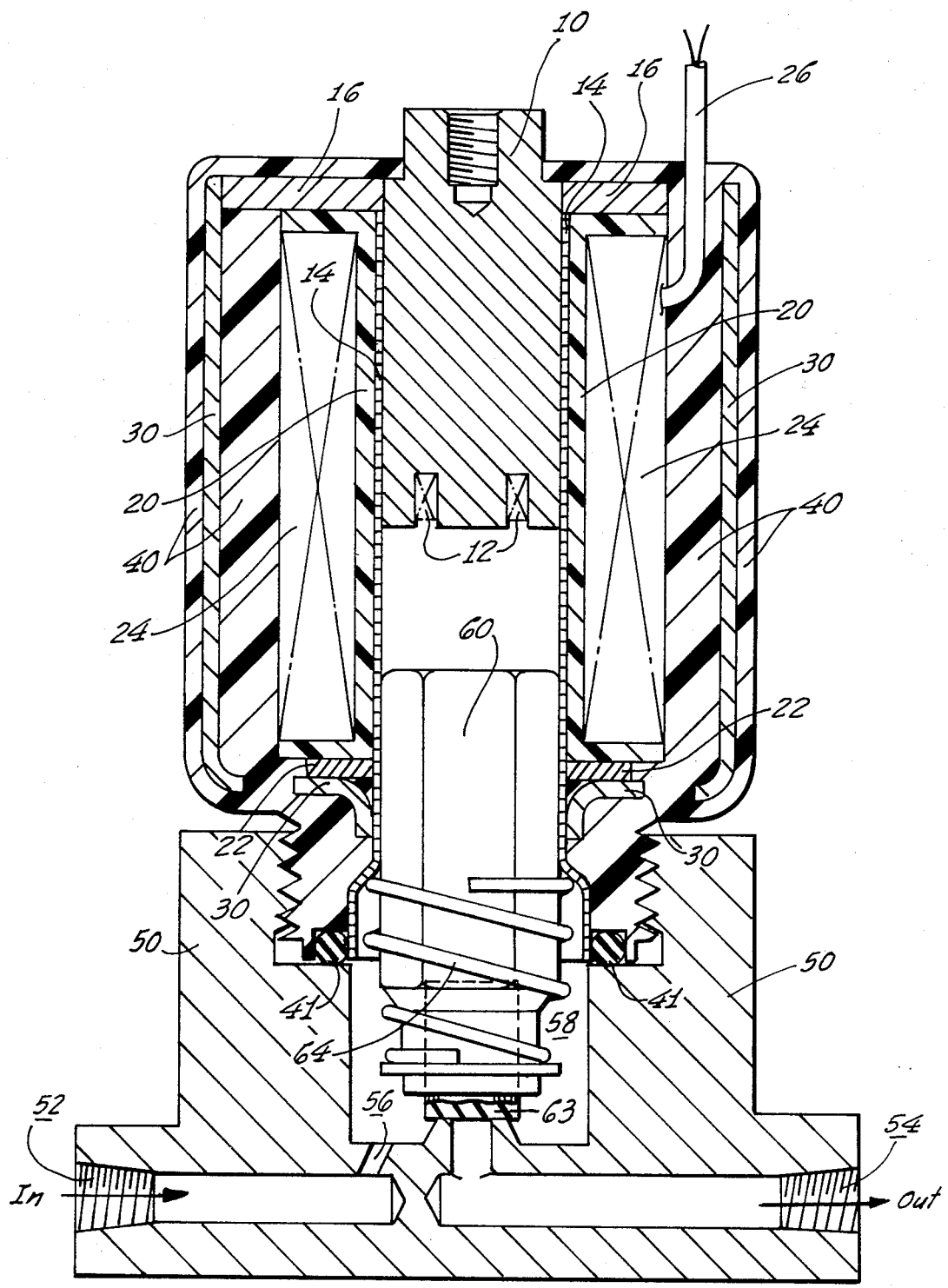

SOLENOID VALVE OPERATOR

RELATED PATENT APPLICATION

Pat. Application Ser. No. 118,657 filed Feb. 25, 1967 for "Valve Assembly."

BACKGROUND OF THE INVENTION

As described in the aforesaid application Ser. No. 118,657, valves used in conjunction with the usual type of vending machine must be capable of controlling the flow of hot liquid, such as coffee, or the like. The valve assembly described in the application is an electrically operated solenoid valve which fulfills the requirements of such vending machines, and which is advantageous in that it is relatively inexpensive, and operates efficiently. Unlike the valve described in the copending application, the valve of the present invention can be used in high pressure environments, and not just in gravity feed mechanisms. The valve of the present invention, therefore, finds application, for example, in air and hydraulic control systems.

The valve assembly defined in the aforesaid patent application has the feature of being composed of a sealed unit which is threaded, or otherwise fitted, into the valve assembly, and which may be removed readily by hand for valve cleaning purposes. In addition, the valve assembly described in the application has no tendency to permit leakage or seepage of the controlled liquid, or to permit the liquid to drip. The valve assembly of the said application is constructed so that no part of the valve mechanism is exposed to the controlled liquid except the face of the plunger itself, as it is seated with or unseated from the valve seat.

The solenoid valve mechanism of the present invention is of the same general type as described in the aforesaid application, and in U.S. Pat. No. 3,598,360. The assembly of the present invention represents an improved and simplified construction, whereby the solenoid assembly is enclosed in a molded plastic casing, and includes a central tubular member, and an O-ring surrounding the end of the central tubular member within a channel formed in the end of the molded casing, so as to seal the casing from the controlled liquid.

The objective of the invention is to provide such a solenoid operator which is constructed so that adequate and complete sealing is achieved in a simplified and inexpensive manner, and by means of an O-ring, mounted in the manner described above. The O-ring has the additional feature, in that when the solenoid operator is screwed into a valve to be controlled thereby, the need for additional sealing means is obviated.

BRIEF DESCRIPTION OF THE DRAWING

The single FIGURE is a side section of a solenoid operator constructed in accordance with the invention.

DETAILED DESCRIPTION OF THE ILLUSTRATED EMBODIMENT

The illustrated solenoid operator includes a central magnetic core section 10 which may, for example, be in the form of an elongated round rod composed, for example, of 430F Series stainless steel. The lower end of the magnetic core section has an annular slot therein, and a ring 12 of electrically conductive non-magnetic material, such as copper, is swedged into the annular slot. The ring 12 forms a shading ring for the magnetic core section 10, for improving the operation of the relay when alternating current electricl energy is used.

The magnetic core 10 is inserted into a metallic tubular member 14 which may be composed of non-magnetic material, such as 302 Series stainless steel. A first washer 16 formed, for example, of cold rolled steel, is fitted over the upper end of the magnetic core, for example, by a swedging action. The tubular member 14 is attached to the core 10 by a suitable adhesive, such as an epoxy resin. The upper end of the tubular member 14 abuts against the washer 16, as shown.

A bobbin 20 formed, for example, of molded epoxy resin, is mounted on the tubular member 14 in coaxial relationship with the tubular member. One end of the bobbin abuts against the washer 16. A second washer 22, which may be formed of cold rolled steel, is fitted over the tubular member 1 in a press friction fit with the tubular member, and the washer 22 abuts against the other end of the bobbin 20. An electrical energizing coil 24 is wound coaxially about the bobbin 20, the coil 24 being energized through leads 26 which extend through the washer 16.

A cup-shaped outer magnetic shell 30 formed, for example, of cold roller steel is fitted over the bobbin 20. The washer 16 closes one end of the shell 30, and the other end extends radially inwardly around the end of the bobbin, and around the washer 22 into a press-fit with the tubular member 14. The tubular member extends through the end of the shell 30, as shown.

The shell 30 is perforated to permit a molded thermosetting plastic casing to be molded about the components of the solenoid. As shown, the molded casing 40 encases the components of the solenoid, and also flows through the holes in the shell 30 to form a further wall about the coil 24, and between the coil and the shell 30. The lower end of the molded casing 40 is threaded, as shown, so that the assembly may be threaded into a valve 50 to be controlled by the solenoid. The valve 50 has an inlet 52 through which the pressurized fluid is introduced into the valve, and it has an outlet 54. The passage of the fluid to the outlet is blocked by a resilient pad 63 at the lower end of a plunger 60.

The lower end of the tubular member 14 is flared outwardly, as shown, and an annular channel is formed at the end of the shell 30, and between the casing and the tubular member. An O-ring 41 is mounted in the annular channel. The flared configuration of the tubular member 14 facilitates the insertion of the plunger 60 into the tubular member in slidable relationship with the tubular member. The plunger 60 may be formed of appropriate magnetic material, such as 430 F Series stainless steel. The plunger 60 slides axially within the tubular member 14 in a close fit therewith.

The plunger 60 is normally spaced axially from the end of the core 10 within the tubular member, and is held in the axially spaced position by a coil spring 64. The spring 64 is coiled around the plunger 60, and its ends engage respectively the flared portion of the tubular member 14 and a shoulder formed around the end of the plunger.

When the solenoid is not energized, the spring 64 holds the plunger 60 in its extended position, and the pad 63 firmly against the seat in the valve 50 in which the solenoid is mounted, as shown. There is no tendency for the liquid controlled by the valve to leak or seep when the valve is closed, or for the valve to drip, since the rubber pad 63 is firmly held against the valve seat. On the other hand, when the solenoid is energized, the plunger 60 is drawn towards the core 10 to open the valve. The O-ring 41 completely seals the plastic casing of the valve, and isolates it from the controlled liquid, whether the valve is open or not, since it is always subjected to the pressurized fluid which passes from the inlet 52 through a channel 56 to an inner chamber 58, the latter chamber being sealed by the O-ring.

As in the previous assemblies, the stainless steel parts of the assembly of the present invention may be passivated for maximum resistance to corrosion. The shading ring 12 may be nickel plated to avoid electrolysis. The illustrated assembly is designed for very low temperature rise and can be operated continuously. A typical size, for example, of the solenoid operator illustrated in the drawing is approximately 1 17/32 inches long and 1 ⅛ inches in diameter. In a constructed 24-volt alternating current model of the solenoid operator described above, the holding current is 0.24 amperes and the in-rush current is 0.48 amperes. The temperature rise is of the order of 39° C. The unit will operate in temperatures ranging from −40° F. to 180° F.

The invention provides an improved solenoid operator for use in conjunction with liquid and/or gas controlling valves, for example, which is relatively inexpensive to construct, and only inherently corrosion resistant and non-reactive parts are exposed to the liquid or gas. The solenoid operator of the invention operates with a high degree of precision and satisfaction and finds utility, for example, in vending machines or the like.

While a particular embodiment of the invention has been shown and described, modifications may be made, and it is intended in the following claims to cover all the modifications which fall within the spirit and scope of the invention.

What is claimed is:

1. A solenoid valve operator assembly comprising: a rod-like magnetic core member; a magnetic tubular member coaxial with said core member and surrounding said core member; a coil mounted on said tubular member in coaxial relationship therewith; a cup-shaped magnetic shell member surrounding said coil in coaxial relationsip with said coil and spaced radially therefrom, said shell member having a perforated necked end portion extending radially inwardly around one end of said coil towards said tubular member and extending axially along said tubular member in press-fit therewith, said tubular member having a radially outwardly flared end portion extending axially beyond said necked end portion of said shell member; an annular magnetic member coaxial with said core member and extending radially between said core member and said shell member at the other end of said coil; a molded plastic casing enclosing said shell member and interposed between said coil and said shell member, said molded plastic casing having an end portion of reduced diameter with external; threads therewith and a peripheral channel therein extending around the extremity of said tubular member; an O-ring mounted in said peripheral channel; a reciprocally linearly movable plunger slidably mounted in said tubular member in axially spaced relationship with said core and protruding through said end portion of said tubular member beyond the end of said molded plastic casing, and a resilient pad affixed to the end of of said plunger.

2. The solenoid valve operator assembly defined in claim 1, in which said tubular member is adhesively attached to said core member.

3. The solenoid valve operator assembly defined in claim 1, and which includes a coil spring surrounding said plunger and engaging said flared end portion of said tubular member for biasing said plunger away from said core.

* * * * *